US012583139B2

(12) United States Patent
Salisbury et al.

(10) Patent No.: US 12,583,139 B2
(45) Date of Patent: Mar. 24, 2026

(54) DEVICE, SYSTEM AND METHOD FOR SLICING FILM MATERIAL

(71) Applicant: AAA Packaging Supplies Pty Ltd, Keilor Park (AU)

(72) Inventors: Timothy Salisbury, Keilor Park (AU); Jonathan Salisbury, Keilor Park (AU); Cameron Salisbury, Keilor Park (AU); Sandy Neeson, Keilor Park (AU); Brad Calleja, Keilor Park (AU); Angelo Bonaventura, Cesena (IT)

(73) Assignee: AAA Packaging Supplies Pty Ltd, Keilor Park (AU)

( * ) Notice: Subject to any disclaimer, the term of this patent is extended or adjusted under 35 U.S.C. 154(b) by 686 days.

(21) Appl. No.: 17/624,072

(22) PCT Filed: Jul. 2, 2020

(86) PCT No.: PCT/AU2020/000059
§ 371 (c)(1),
(2) Date: Dec. 30, 2021

(87) PCT Pub. No.: WO2021/000005
PCT Pub. Date: Jan. 7, 2021

(65) Prior Publication Data

US 2022/0395995 A1 Dec. 15, 2022

(30) Foreign Application Priority Data

Jul. 2, 2019 (AU) ................................ 2019902334

(51) Int. Cl.
*B26D 1/02* (2006.01)

(52) U.S. Cl.
CPC .................................. *B26D 1/025* (2013.01)

(58) Field of Classification Search
CPC ......... B26D 1/025; B65B 61/06; B65B 61/10; B65B 59/04; B65B 59/003; B65B 11/045; B65B 2220/06
(Continued)

(56) References Cited

U.S. PATENT DOCUMENTS 3,110,927 A * 11/1963 Koppehele ........... B29C 55/165 26/72
4,235,062 A 11/1980 Lancaster, III et al.
(Continued)

FOREIGN PATENT DOCUMENTS

EP 2 589 540 A1 5/2013
FR 2668448 A1 * 4/1992 ........... B65B 11/006
(Continued)

OTHER PUBLICATIONS

Search Report dated Apr. 22, 2020 from the Australian Patent Office in AU Application No. 2019902334.
(Continued)

*Primary Examiner* — Ghassem Alie
(74) *Attorney, Agent, or Firm* — Sughrue Mion, PLLC

(57) ABSTRACT

A method, system and apparatus is disclosed for stretch wrapping which provides a device adapted to provide strips of material of various widths, the device includes: one or more blades for slitting a film of material to form two or more strips, a primary guide for guiding the two or more strips, a secondary guide, over which the strips pass, and two or more shaped recesses operatively associated with one of the primary guide or the secondary guide, each recess guiding a strip, wherein the width of the strips can be varied by altering the relative positions of the primary guide and secondary guide.

28 Claims, 9 Drawing Sheets

(58) Field of Classification Search
USPC ........... 83/13; 53/141, 556, 587, 389.3, 399, 53/441, 140
See application file for complete search history.

(56) References Cited

U.S. PATENT DOCUMENTS

| | | | | |
|---|---|---|---|---|
| 4,671,043 | A * | 6/1987 | Forni | B65B 53/00 53/399 |
| 5,168,685 | A | 12/1992 | Suzuki | |
| 5,447,009 | A * | 9/1995 | Oleksy | B65B 11/045 53/399 |
| 5,634,324 | A * | 6/1997 | Schmachtel | B31B 70/18 53/551 |
| 9,802,722 | B1 * | 10/2017 | Bison | B65B 11/585 |
| 10,960,998 | B2 * | 3/2021 | Nicholson | B65B 11/006 |
| 11,434,029 | B1 * | 9/2022 | Bison | B65B 59/003 |
| 2005/0123721 | A1 * | 6/2005 | Heikaus | B29C 66/1122 428/137 |
| 2014/0109525 | A1 | 4/2014 | Nelson | |
| 2015/0306849 | A1 * | 10/2015 | Lopez | B32B 7/12 156/73.2 |
| 2017/0313020 | A1 * | 11/2017 | Grubbs, Jr. | B32B 38/18 |
| 2019/0084703 | A1 | 3/2019 | Nicholson | |
| 2024/0140634 | A1 * | 5/2024 | Salisbury | B65H 18/103 |

FOREIGN PATENT DOCUMENTS

| | | | | |
|---|---|---|---|---|
| FR | 2692225 | A1 * | 12/1993 | B65B 11/045 |
| WO | 92/007761 | A1 | 5/1992 | |

OTHER PUBLICATIONS

International Search Report dated Sep. 15, 2020 from the International Searching Authority in International Application No. PCT/AU2020/000059.

Written Opinion dated Sep. 15, 2020 from the International Searching Authority in International Application No. PCT/AU2020/000059.

International Preliminary Report on Patentability dated Dec. 28, 2021 from the International Bureau in International Application No. PCT/AU2020/000059.

* cited by examiner

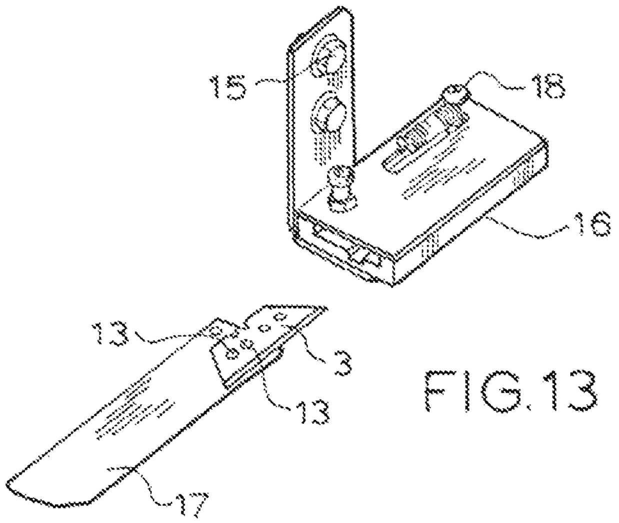
FIG.13
FIG.14
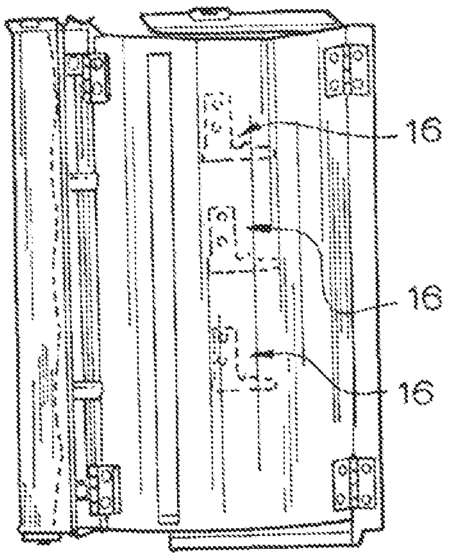
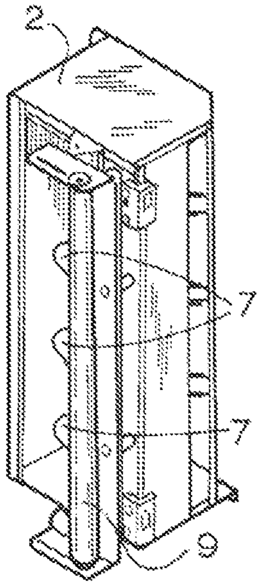
FIG.15

DEVICE, SYSTEM AND METHOD FOR SLICING FILM MATERIAL

RELATED APPLICATIONS

This application is a National Stage of International Application No. PCT/AU2020/000059 filed Jul. 2, 2020, which claims priority to Australian Provisional Patent Application No. 2019902334 in the name of Omni Group Pty Ltd, which was filed on 2 Jul. 2019, entitled "Device, System and Method for Slicing Film Material" and the specification thereof is incorporated herein by reference in its entirety and for all purposes.

FIELD OF INVENTION

The present invention relates to the field of wrapping palletised items and loads. In particular, the present invention relates to stretch wrapping in which ventilation of the load is required or beneficial. In one aspect the present invention is suitable for use in stretch wrapping loads on pallets. In another aspect the present invention is suitable for slicing film used for stretch wrapping into strips. The present invention is suitable for producing film strips of different or varying widths. It will be convenient to hereinafter describe the invention in relation to wrapping palleted loads however it should be appreciated that the present invention is not so limited and is suitable for use in the field of wrapping generally and for wrapping a wide range of goods, or collections of goods. Embodiments of the present invention may find use with a wide range of film, not solely materials used for wrapping.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Unit loads of goods are often placed on pallets. Pallets generally have a flat structural foundation that is configured for ready handling, storage and movement by fork lifts, pallet jacks, front loaders, jacking devices or cranes. Wooden pallets for example, typically consist of multiple stringers that support deck boards on which the goods are stacked. Typically, pallets are made of timber, metal, plastic and other materials. Pallets have supplanted older forms of transporting goods such as boxes and wooden barrels.

Often a unit load is secured to the pallet and protected by a film such as plastic pallet wrap film, ie stretch film, that is stretched around the goods and pallet, either by hand, or by a wrapping machine. Stretch wrap can also be used in horizontal spiral wrapping machines to protect a bundle of goods, such as lengths of timber, or flat pack cabinet panels.

Pallet wrapping machines typically comprise a rotary turntable on which a pallet stacked with goods is placed for rotation during the wrapping process. A roll of stretch wrap is located adjacent the turntable and the wrap is drawn from the roll and applied to the goods and pallet as the turntable rotates. The roll is moved up and down to apply overlapping layers of stretch wrap on the goods and the pallet. As an option with some machines, at the end of the wrapping process the film may be gripped by a pair of jaws and then cut. The cut end of the wrap is then usually pressed and adhered to the film covering the goods. The end of the wrap extending from the roll remains held by the gripping jaws until the wrapping process is recommenced on a new pallet.

Making sure boxes stay on the pallet and properly aligned is an important consideration in warehouse distribution and materials handling in general, especially as the demands for increased throughput continues to rise.

Pallet wrapping machines are well known in the art. A typical pallet wrapping machine is disclosed for example, in U.S. Pat. No. 9,981,762. (Chambers).

Pallet wrap is often referred to by names such as 'stretch film' or 'stretch wrap'. However, pallet wrap is distinguished from other types of polymer film by its ability to stretch and then pull back. The pallet wrap typically comprises stretch wrap or stretch film, which is a highly stretchable plastic film that is wrapped around items. The elastic recovery keeps the items tightly bound. In contrast, shrink wrap is applied loosely around an item and shrinks tightly with heat. Stretch wrap is frequently used to unitize pallet loads but also may be used for bundling smaller items. By way of example, types of stretch film may include bundling stretch film, hand stretch film, extended core stretch film, machine stretch film and static dissipative film. A common stretch wrap material is linear low-density polyethylene (LLDPE), which is produced by copolymerization of ethylene with alpha-olefins, the most common of which are butene, hexene and octene. The use of higher alpha-olefins (hexene or octene) gives rise to enhanced stretch film characteristics, particularly in respect of elongation at break and puncture resistance. Other types of polyethylene and PVC can also be used. Stretch wrap films can have up to about 400% stretch at break point but are usually only stretched to between about 100% to about 300% in use. In use, stretch films are stretched to a percentage which is a function of what the machine itself will allow. Once stretched, the elastic recovery of the stretch wrap is used to keep the load tight. There are two methods of producing stretch wrap. 1) Blown: a polymer resin is melted and extruded through an annular die and then, it is air-cooled. This is a slower process but provides for higher quality in function and application. The cost of production may also be higher due to the quantity that can be produced per hour. 2) Cast: the film is extruded through a slot die, then passed over cooling rollers. This makes the cooling process quick. The quality is not as good as blown but more can be produced in an hour with lower costs. In pallet unitizing, stretch wrap can have several functions, such as the following:

- improved stability of products or packages, forming a unit load
- more efficient handling and storage of unit loads
- some degree of dust and moisture protection
- some degree of tamper resistance and resistance to package pilferage
- some degree of sun protection (UV stretch wraps)
- extend shelf life of certain foods In general, the more the pallet wrap can stretch, the tighter the wrap may be. A pallet wrap that stretches well with high resilience that provides an ability for the wrap to lock in and pull back tight ensures the wrapped load is tightly secured to the pallet, reducing the chance of breakages and other damage to the goods.

One of the characteristics of pallet wrap is that it may not 'breathe' sufficiently to keep the wrapped goods in peak condition. This is a consideration for pallet loads that include certain product types, for instance, cooled or refrigerated loads, perishable loads and medical loads by way of example. 'Breathing' refers to exchange across the stretch film material of gases such as oxygen, small molecules such as water, and also heat. While this is unlikely to be a problem for goods such as metal nails or plastic cups, it can be a problem for pharmaceutical compounds or fruit, vegetables, flowers, eggs and other foodstuffs, plants, or other perishable goods. These types of goods can be damaged during transport due to condensation forming between the load and the wrap, or lack of oxygen can cause wilting and discolouration. Furthermore, condensation can affect certain types of packaging by corroding metal caps, discolouring labels, causing mould growth and introducing moisture to products comprising paper or cardboard. In many cases, the goods end up with poor appearance and may be unfit for consumption.

This problem is generally addressed by applying pre-slit or 'ventilated' film as a stretch wrap to be used in a normal stretch wrapping machine for the palletised goods. The slitting permits air flow to help prevent condensation from building up under the film so that the goods can remain fresh and condensation free. Whilst ventilated film is available presently in the market, the manufacturing of it off site makes it so expensive it is often not commercially viable to use.

In another prior art example, Phoenix Wrappers ULC provide a Breathe Easy™ film slitter which slices the pallet wrap into three (3) or more strips of set width.

However, the prior art does not allow for adjustment or change of the strip width in a straightforward manner. In this respect, another example of prior art is disclosed by Canadian patent application No. 3,017,514 in the name of Phoenix Wrappers ULC (CA 3,017,514), which describes a method for securing a palletised load with stretch film wrap. In particular, the invention disclosed is directed at overlapping two or more stretch films to obtain a multi-ply band where the overall resistance of the combined stretch film can be increased in the region of the multi-ply band to prevent any tear which might start in one of the initial stretch films from propagating along the entire width of the stretch film as it is applied to a pallet load. Essentially this prior art disclosure is directed at a stronger stretch wrap being produced by overlapping two or more films. Notably though, at pages 27 to 31 of the specification of CA 3,017,514 in conjunction with FIGS. 7, 11 and 15, there is disclosure according to some implementations of the invention for the width of an edged stretch film or of a rope being varied for a single palletised load and this is performed by the positioning of the guide(s) or roller(s) involved in the edging or roping of the stretch film around the palletised load being varied during a single stretch wrapping operation. However, in order to do so, the guide(s) or roller(s) are translated along a vertical axis using an automated system translating the guide(s) or roller(s) according to a given pattern. The vertical axis movement is required in order to effect a change of the overlap of the two or more stretch films that combine to form the multi-ply bands.

Furthermore, the prior art does not allow for modification or adaptation of existing wrapping machines to produce strip wrapping from non-ventilated stretch wrap in situ or strip wrapping of different widths in situ. In addition, the prior art does not provide for strips of stretch wrapping of differing width to be applied in situ in a manner that complies with the highest standards of occupational health and safety. It is also noted that, in prior art systems, the slicing of film may be performed by knife blades that are otherwise exposed or protruding, which can be considered a risk to the health and safety of operating staff.

By way of further examples of prior art, FR 2692225 A1 (Thimon Jacques) relates to stretch wrapping of film, and in particular to helically depositing strips of stretch wrapping around a palletised load. This system is directed to addressing the general problem of the 'banding of loads which must be aerated'. A number of prior art devices are noted by FR 2692225 in which they are all stated to involve high investment and cost to install and use. Furthermore, they do not offer the flexibility of being able to bandage a load in the middle of the width and then of being able to bandage the next load. The system of FR 2692225 comprises a device which can be adapted to known stretch wrapping machines and includes a support which attaches the device to the film dispenser of a stretch wrapping machine. The device comprises two rollers that are motorised for rotation and the two rollers can be moved with respect to each other. One roller divides film into narrow strips by virtue of being a multi-grooved roller with edges formed by the grooves that cut by adding blades or directly by the shape of the edges. The other roller disengages the film from contact with the cutting system of the other roller. A cam is provided which uses a link piece to control the relative movement of the two rollers. The cam disengages the film cutting system when the dispenser is at the start and end of the wrapping cycle for a pallet. A simple tension spring moves the device from the inactive to an active system when the film is divided into narrow bands. The advantage described by this invention is that it allows unit loads to be stacked from packages of products which require a circulation of air. As noted in the description of FR 2692225, the importance or distinguishing feature of the invention disclosed is the relative movement of one roller with respect to the other roller to allow successively the release of the cutting means and cording of film strips, then their engagement and finally their release in the wrapping action. However, whilst there is relative movement between components in a strip cutting adapter, there is no teaching or any contemplation in FR 2692225 for the ability to vary the width of strips in situ.

U.S. Pat. No. 5,168,685 A1 (Suzuki) relates to a method and an apparatus for packing goods so that they are kept aired. This disclosure notes that conventional stretch wrapping methods are not suitable for packing fruits and the like which necessitate airing, since these goods are sealed up by the film owing to the adhesion of the film itself, and therefore net packing has been adopted for packing with airing. However, a net is much more expensive than the stretch-wrap film and, in addition, it needs to be fixed at the starting end and the terminal by an adhesive tape or the like in the case of pallet packing. Consequently, the packing operation requires extra labor and time. U.S. Pat. No. 5,168,685 provides a solution in the form of a film tape split in a prescribed width beforehand or a plurality of film tapes split in prescribed widths in the course of supply are wound round forward and backward on a pallet-amassed goods on a rotary table obliquely from the upper or lower end of the goods, while they are stretched in parallel simultaneously at a desired multiplication rate, so that diagonal or mesh-like space parts be formed. The treatment of the starting end and the terminal of this film can be conducted in the same way as in usual stretch film packing so as to seal up only the surface of the upper part of the goods by the stretch film, for instance, and thereby to prevent the infiltration of raindrops. Essentially, the function of U.S. Pat. No. 5,168,685 is described at column 2, lines 53 to 60 where it states "A stretch-wrap film F from the feed roll 3 is split into five tapes T as shown in FIG. 3, for instance, by the slitter 6 and is stretched in parallel in accordance with the ratio in rotation between the brake roll 8 and the rotary table. Therefore, the respective width of the tapes is made small according to the multiplication rate of stretch and the tapes are wound round biasly in said tape widths on amassed goods." U.S. Pat. No. 5,168,685 mentions that the width of the tape to be wound can be adjusted arbitrarily, but this is performed by changing the multiplication rate of stretch and the number of the knife edges or the amount of fold at the opposite edges, and thereby the dimensions of the airing parts can be varied. In other words, U.S. Pat. No. 5,168,685 is at least dependent on a stretching bias being applied as part of the width varying function and as such provides additional complexity to an existing pre-stretch or stretch wrapping machine.

U.S. Pat. No. 5,447,009 (Oleksy et al.) relates to a method and apparatus for wrapping a palletised load with structural plastic film in a manner that creates open spaces between adjacent strips of film on the load. Therefore, U.S. Pat. No. 5,447,009 is directed to the type of pallet loads which require air spacing between plastic film strips in order to allow the products to "breathe." U.S. Pat. No. 5,447,009 identifies prior art problems associated with netting and its deficiencies of being labour intensive, expensive and preventing automated wrapping etc. U.S. Pat. No. 5,447,009 also identifies problems of wrapping with individual pre-cut strips, wrapping with roped or corded film. Finally, U.S. Pat. No. 5,447,009 details problems associated with prior proposed solutions of winding the full width of film to secure the lower part of the goods on the pallet and subsequently to cut the film into strips. This is similar to the system described in U.S. Pat. No. 5,168,685 A1 (Suzuki), noted above. In the method of U.S. Pat. No. 5,447,009, strips are then wound about the load, strips having spaces therebetween and, before the wrap is finished, the cutting operation is stopped and the full width of the film is restored so that the full width of the film may be wound about the upper part of the goods for at least one turn. U.S. Pat. No. 5,447,009 notes that while this method corrects many of the problems inherent in the prior art, it also presents other problems. For instance, cutting the film web into strips has presented problems in that the film web is stretchable and elastic. Often the cutting mechanism does not actually cut the film but instead only creases the film web. The elasticity of the film also causes bunching at the cutting edge, inaccurate cutting and tearing of the film web. Further, the proposed method requires the use of a full web of film at both the top and bottom of the pallet. The use of a full web effectively seals both the top and bottom layers of a palletised load within a non-breathable film strip. This is undesirable for all the reasons set forth above. Specifically, fresh produce in the top and bottom layers will more easily spoil since condensation cannot escape, hot-wrapped products are unable to cool properly and products palletised in a freezing environment are unable to thaw properly. By way of solution, U.S. Pat. No. 5,447,009 discloses a film carriage having a spool of film that is provided to a wrapping machine for wrapping a palletised load and the film carriage includes a means for unwinding the film from the spool from an upstream winding position to a downstream position in accordance with a selected path where it is applied to the load. Pre-stretching rollers for pre-stretching the film before it is applied to the load are contained on the film carriage. Cutting blades are used to pierce the film, downstream of the pre-stretching rollers, into longitudinally extending strips. The strips are then separated into longitudinally extending bands by a separating roller. The bands are applied to a load by the carriage which slidably moves up and down along a support column in combination with a turntable upon which the load rotates. The only mention of variable width or 'size' of the film bands mentioned in U.S. Pat. No. 5,447,009 is at column 13, lines 57 to 67 where it is stated that " . . . each of cutting edges 101 may be separately actuated to intersect the path of film 16. This would provide additional flexibility as to the size of film bands 16a-16e and the number of film bands 16a-16e applied to load 11. The size and number of film bands could also be varied by other means, including changing the number of cutting edges 101, changing the spacing between adjacent cutting edges 101 or changing the configuration of separating roller 45 to reduce or add to the number of elliptically-shaped bulbs 105 and/or bushings 115." U.S. Pat. No. 5,447,009 is wholly silent of any mechanism that can vary the width of film strips in situ.

U.S. Pat. No. 4,235,062 (Lancaster, III et al.) addresses the same general problems associated with breathable pallet loads as described in the previous prior art references. However, U.S. Pat. No. 4,235,062 discloses a system that does not contemplate cutting or slicing film to make a netted packaging. Instead, U.S. Pat. No. 4,235,062 discloses a system and process for automatically making a spiral wrapped unitary package with a single web of stretchable material to form a netting overwrap. This is achieved by a process of spirally wrapping a web of stretch material on a load comprising a plurality of units to form a unitary package load with a breathable overwrap in which a roll of stretchable material is placed on a dispenser means, and the stretchable material is withdrawn from the dispenser means and collapsing the film web to reduce its width. The only cutting or slicing of film material that is disclosed by U.S. Pat. No. 4,235,062 concerns the cutting of the web material at the end of the wrapping action for a pallet to form a new leading edge of material for the next pallet to be wrapped.

EP 2589540 (Control D' Embalatges S. L.) is directed to stretch wrapping and discusses pallet wrapping processes that involve both continuous film and 'macroperforated' plastic film. EP 2589540 notes that continuous film has the disadvantage of avoiding breathability and ventilation for the packaged goods along with the associated problems for the wrapped goods themselves. EP 2589540 then notes that with respect to microperforated film, it consists of a plastic film having a series of holes, forming parallel rows along the film, alternating with longitudinal reinforcements that improve the mechanical properties of the film. The macroperforated film holes avoid the problems of breathability, ventilation and condensation of the continuous film so that the macroperforated film is especially suitable for wrapping boxes of fruit, vegetables and natural products in general. EP 2589540 notes that a major problem of the macroperforated plastic film reels is that they are irregular due to the uneven overlapping of holes and reinforcements, whereby dispensing is complex and prone to producing blockages and interruptions in the operation of the wrapping machine. However, a particularly important problem with the macroperforated film reels is their high cost compared to the continuous film reels. EP 2589540 provides a solution that aims to reduce wrapping costs and improving operational reliability by facilitating wrapping with a macroperforated film by preparing the film using the wrapping machine itself starting from conventional continuous film reels. According to the invention of EP 2589540, the wrapping machine comprises: cutting rollers for defining holes in the continuous film from the reel and transforming the continuous film into a macroperforated film prior to the application thereof to the load to be wrapped. The set of cutting rollers is configured by a roller fitted with radial cutting blades arranged in parallel planes and by an opposing counter-roller, where the continuous plastic film passes between which rollers. The wrapping machine of EP 2589540 further comprises an additional reel holder bearing at least one film reel for supplying reinforcing film strips, and means for the lateral concentration of each of the reinforcing film strips and the shaping of respective cords. These cords are intended to be applied in parallel and in longitudinal direction on one side of the continuous film so that said cords are positioned between the holes of the macroperforated film. The arrangement of EP 2589540 provides a combination of perforations in a continuous film, no slicing or cutting together with an overlay of corded film for reinforcement of the wrapping.

US 2014/0109525 (Encore Packaging, LLC) relates generally to the packaging industry and, more specifically, to the application of stretch film or wrap to objects. Specifically, US 2014/0109525 addresses problems of typical approaches to stretch wrapping where the stretch creates a lengthening of the stretch wrap, but also creates significant narrowing of the stretch wrap in the direction not under tension. The narrowing causes less coverage of the object being wrapped and eliminating much of the efficiency gained in stretching the stretch wrap. US 2014/0109525 also addresses the problem of another known approach which is to stretch the stretch wrap with tension in the long direction while holding the sides of the stretch wrap to reduce narrowing. Such an approach is largely done through complex and expensive machinery. Finally, US 2014/0109525 mentions the problem associated with products that need to be ventilated to avoid spoilage or for evaporation of water. In that respect, US 2014/0109525 notes that current applications use stretch film that has holes cut into the film to allow the film to breath. This process is either done in-line during the manufacturing of the stretch film with expensive equipment or done off line as a secondary operation using expensive equipment to wind, perforate and then rewind the film. US 2014/0109525 provides the solution of a stretch wrap manipulator that includes one or more cutting members arranged, for instance, in parallel and designed to engage the stretch wrap to cut it into strips (or variably stretch the stretch wrap film along a length of the film) as it is dispensed from the roll. The strips are then gathered and stretched into strings that are wrapped around the object. The strings formed from the stretch wrap can stretch to an extended length while maintaining tensile strength to secure heavy loads. Accordingly, US 2014/0109525 states its advantages such that such approaches save on the volume of stretch wrap used to secure a load without significantly compromising strength as a result of the stretching action while gathering the strips into strings. It also successfully wraps the load while providing the ventilation needed that is commonly provided by the more expensive vented film.

WO 1992/007761 (Gennesson, Patrick) is directed to stretch wrapping applications. It describes a number of prior art problems to be addressed. According to a first method of packaging the whole width of the film is wound around. In this case, after envelopment, no gaps are left, with the result that the products cannot breathe. Condensation may take place with undesirable results for foodstuffs, for example. According to a second method of packaging the film is cut beforehand into strips of reduced width and then wound around in such a way as to leave spaces between each of the strips. Whereas this solution allows the problem of aeration referred to above to be solved, it also gives rise to a very substantial weakness in the resistance to stress of the film such that it is not possible to wind it around with sufficient tension without the risk of breaking it. In order to overcome this disadvantage, it has been proposed to increase the tensile strength of the film in changing its original flat section in order to make it narrower while proportionally increasing its thickness. The film obtained has very much the appearance of a cord. While this solution brings about a substantial improvement in the level of the quality of the film given that it is possible to palletise products in a very aerated manner with adequate film tension without risk of rupture a problem arises in connection with the palletisation operation itself. The network of cords resulting from the transformation is firstly attached to the feet of the pallet then wound around helicoidally over the full height of the goods by means generally of a pelletizing machine. A first problem arises in connection with the securing of the products to the pallet, given that the network of cords does not provide sufficient width to secure, in a certain and effective manner, products placed directly on the pallet to the body of the pallet. Furthermore, another problem can arise at the finish of wrapping as certain cords can pass above the products palletised in such a manner that these cords are stretched giving rise to a risk of rupture given the tension to which the cords are subjected during the course of their being wrapped around. Finally, when the operation of palletisation is completed, it is necessary to attach the bunch of cords to one of the feet of the pallet after having gathered the cords together. It is understandable that this operation reduces the time of palletisation and can sometimes prove delicate. In order to resolve the above problems, WO 1992/007761 provides a process of palletisation which includes the following steps:

- the full width of the film is wound on over at least one turn in such a way as to secure the lower part of the goods to the pallet;
- the film is cut into at least two strips which are submitted to an operation adapted to transform their cross-section in order to increase their tensile strength. Effectively, this operation is the transformation of the strips into cords;
- the strips thus transformed are wound around almost the whole of the height of the products being palletised;
- the cutting operation is stopped to restore the full width of the film;
- the full width of the film is wound around the upper part of the goods for at least one turn.

WO 1992/007761 requires the dual operation of a first slicing of film into at least two strips of predetermined width then passing the strips through shaped discs or rollers to obtain cords.

Many of the noted prior art systems do not allow a quick change of the film strips width. For many reasons the user may need to change the film strips width for example an operator may want to wrap at a slow rotation speed because the pallet is unstable so they need narrow strips otherwise the pallet will be completely covered and the load will not breathe. On the other hand, the operator may need to wrap quickly so they need to have wider strips to cover enough of the pallet for sufficient packaging. Having the possibility of quickly changing the width of the strips, the user can easily choose the width for their load. In general, the prior art systems do not provide this possibility.

The preceding discussion of background art is intended to facilitate an understanding of the present invention only. The discussion is not an acknowledgement or admission that any of the material referred to is or was part of the common general knowledge as at the priority date of the application.

SUMMARY OF INVENTION

An object of the present invention is to provide improved packaging that can be adapted according to the nature of the goods. A further object of the present invention is to provide an improved device and method of slitting packaging material. Yet another object of the present invention is to provide an option for modifying existing packaging machines to provide packaging that breathes.

It is an object of the embodiments described herein to overcome or alleviate at least one of the above noted drawbacks of related art systems or to at least provide a useful alternative to related art systems.

In a first aspect of embodiments described herein there is provided a device for providing strips of material of various widths, the device including:

one or more blades for slitting a film of material to form two or more strips, a primary guide, which may comprise two or more shaped recesses, preferably V-shaped recesses, each recess guiding a strip, and a secondary guide, preferably a roller, over which the strips pass, wherein the width of the strips can be varied by altering the relative positions of the primary guide and secondary guide.

Preferably, the relative positions of the primary and secondary guides are varied in a direction which is substantially in a direction of flow of the strips. Furthermore, the two or more shaped recesses may be provided with either the primary or the secondary guide.

Preferably, the blades are retractable for protection of operators and may be guarded for protection of the blades.

Whilst the two or more shaped recesses of the primary guide are preferably V-shaped, in general, they are of a tapered cross section in order to provide the function of one or a combination of edging or roping film material as it passes through the primary guide.

A device in accordance with embodiments of the present invention is preferably used to slit a roll of film material, such as a roll of plastic stretch wrap. For example, the stretch wrap may emanate from a roll within a packaging machine, such as a pallet wrapping machine for applying stretch wrap. Preferably the device of the present invention can be installed on packaging machine carriages with mechanical/electromechanical film regulation or carriages with motor-driven pre-stretching. Typically, the pallet wrapping machine dispenses the roll of film material onto a pallet loaded with goods on a rotatable platform and encloses them in the plastic stretch wrap.

In a preferred embodiment, the device of embodiments of the present invention is modular, that is it can be removably, or permanently, attached to an existing machine of one of a selection of machine formats or models.

Thus, in a second aspect of embodiments described there is provided a system for wrapping palletised goods using strips of stretch film wrap, the system comprising;

(a) a pallet wrapping machine adapted to be loaded with stretch film wrap for wrapping around a pallet loaded with goods, (b) a modular device associated with the pallet wrapping machine, the device including:

one or more blades for slitting stretch film wrap emanating from the pallet wrapping machine to form two or more strips, a primary guide comprising two or more V-shaped recesses, each recess guiding a strip, and a secondary guide, preferably a roller, over which the strips pass, wherein the width of the strips can be varied by altering the relative positions of the primary guide and the secondary guide.

Preferably, the relative positions of the primary and secondary guides are varied in a direction which is substantially in a direction of flow of the strips.

Preferably, the blades are retractable for protection of operators and may be guarded for protection of the blades.

In a preferred embodiment the primary guide is intermediate the blades and the secondary guide.

In a preferred embodiment the recesses of the primary guide are V-shaped recesses and form a saw tooth shaped leading edge of the primary guide.

It will be readily apparent that the primary guide, or the secondary guide, or both can be moved. The relative positions can be changed to a predetermined position to provide a single desired strip width. Alternatively, the relative positions of the guides can be variably or continuously changed as the strips pass across the guides to provide strips of variable width.

In essence, embodiments of the present invention stem from the realisation that varying relative positioning between a primary edging or roping guide and a secondary roller guide can be used to control the strip width of pre-slit film in situ. More particularly, the relative disposition of the guides positions the pre-slit strips within tapered edging or roping recesses of the primary guide to affect the strip width.

In another aspect of embodiments described herein there is provided a method of cutting film material into strips of various width, the method comprising;

providing a flow of film material, passing the film material across one or more blades to form two or more strips, passing each strip through a V-shaped recess in a primary guide, passing each strip over a secondary guide, altering the relative positions of the primary guide and the secondary guide to vary the width of the strips.

In preferred embodiments of the method of the present invention, the relative positions of the primary and secondary guides are varied in a direction which is substantially in a direction of flow of the strips.

Preferably, the step of passing each strip through a tapered recess in a primary guide comprises one or a combination of roping and edging.

Other aspects and preferred forms are disclosed in the specification and/or defined in the appended claims, forming a part of the description of the invention.

Advantages provided by the present invention comprise the following:

Provides high ventilation but strong stabilisation of a load of goods;

Ability to provide strips of predetermined width, or to vary the width during packaging;

The device of the present invention can be modular;

The device of the present invention can be retrofitted to some existing packaging machines;

- The device of the present invention drastically reduces the cost of using pre-slit or ventilated film such that the ventilating can be done as a part of the normal wrapping process;
- Preferred embodiments of the present invention provide a retrofit modular adaptor suitable for permanent or removable connection to an existing pre-stretching or stretch wrapping machine and, as such, the need for any braking drum or stretching roller associated with the modular device is obviated thus providing a simple convenient modular device for fitment to existing stretch wrappers;
- Embodiments of the present invention provide improved safety with respect to the film slitting blades, which are guarded and are retractile such that they are exposed for cutting use only when the modular system is closed and the blades can't be reached by operators and, when the system is open blades are protected.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present invention may be better understood by those skilled in the relevant art by reference to the following description of embodiments taken in conjunction with the accompanying drawings, which are given by way of illustration only, and are not limitative of the disclosure herein, and in which:

FIGS. 10 to 15 illustrate a method for replacement of blades in the device of the present invention according to a preferred embodiment.

DETAILED DESCRIPTION

List of Parts Shown in the Figures

| | | | |
|---|---|---|---|
| 1 | (Modular) Device/Adaptor | 2 | Frame |
| 3 | Blades | 4 | Idle rollers |
| 5 | Casing door | 6 | Casing wall |
| 7 | Primary guide | 8 | V-Shaped recesses |
| 9 | Secondary guide | 10 | Adjustment screw |
| 11 | Bracket | 12 | Casing door hinge |
| 13 | Blade unit screw | 14 | Frame locks |
| 15 | Blade holder screw | 16 | Blade holder |
| 17 | Blade unit | 18 | Blade screws |
| 19 | Roll of film material | 20 | Strips of material |
| 21 | Pre-stretching carriage (known prior art model No. C1HG0172) | 22 | Pre-stretching carriage (known prior art model No. C1HG0145) |
| 23 | EM Carriage | | |

Figure 1:
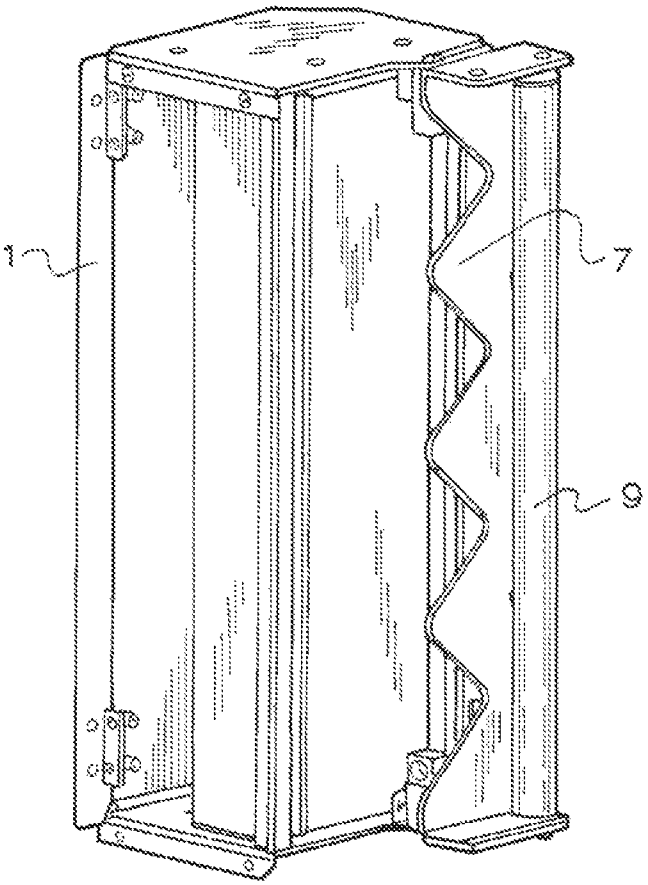
FIG. 1 illustrates a preferred embodiment of the device (1) of the present invention.

FIG. 1 illustrates a preferred embodiment of a device (1) in accordance with the present invention in a modular form, suitable for permanent or removable connection to an existing wrapping machine such as a pallet wrapping machine. The preferred device is a removable adaptor component for use with stretch wrapping machines. In this preferred embodiment, the present invention provides a commercially viable option for ventilation of wrapped pallets in cool rooms to reduce refrigeration energy cost.

Figure 2:
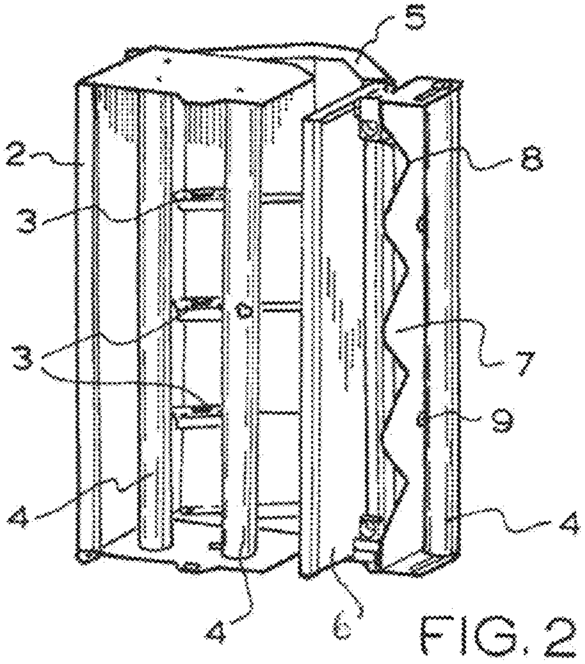
FIG. 2 illustrates a device (1) in accordance with an embodiment of the present invention with the outer casing opened up so that three blades (3) can be seen.

FIG. 2 illustrates a device (1) according to an embodiment of the present invention with the outer casing (6) of the adaptor component open with the casing door (5) opened so that three blades (3) can be seen. The blades (3) are the parts of the component that cut or slice the wrapping film. The frame (2), inclusive of the outer casing (6) (which is in the form of a wall) and door (5), is comprised of a load-bearing structure made from steel panels and profiles to create a strong support. Idle rollers (4) ensure that the film material (not shown) is dispensed correctly and passed onto or across the three blades (3). Idle rollers (4) guide film material (not shown) onto the three blades (3). The three blades (3) slit the film material into four strips or bands, each strip passing through a V-shaped recess (8) in the primary guide (7). In the embodiment shown, the primary guide (7) may be in the form of an adjustment plate. The adjustment plate (7) can be varied in its configuration depending on the strips to be obtained and its relative position determines the width of the film strip. The V-shaped recesses of the adjustment plate (7) may provide one or a combination of the functions of edging and/or roping the film as it passes through. The position of each strip in the V-shaped recess (8) and the concomitant strip width is dependent on the position of the second guide (9), which in this embodiment is another idle roller. In the embodiment shown, the film once slit by the blades (3) passes through the primary guide (7) with its shaped recesses then onto the secondary guide (9). In alternate embodiments, not shown, the slit film strips may pass through an initial or primary guide and then onto a secondary guide that has the shaped recesses for providing one or a combination of the functions of edging and/or roping the film as it passes through.

Figure 3:
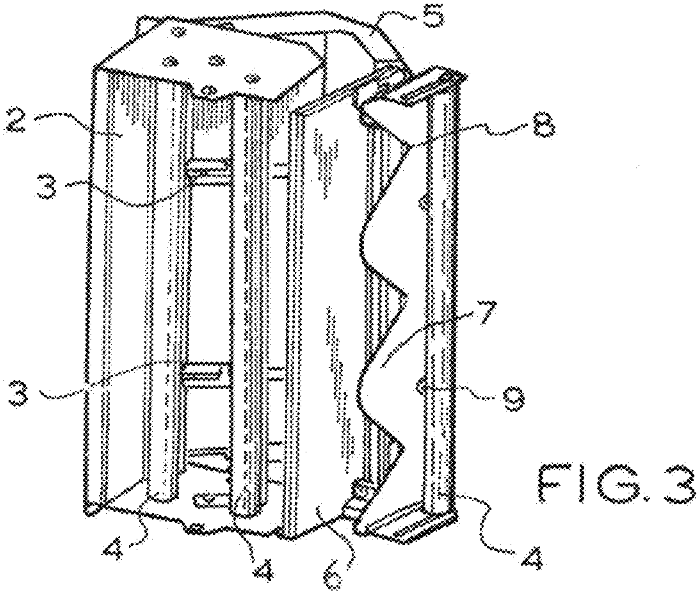
FIG. 3 illustrates another embodiment of the device (1) of the present invention with the outer casing opened up so that two blades (3) can be seen.

The three-blade device of FIG. 2 can be readily converted into the two-blade device of FIG. 3 or, converted into a device having any convenient number of blades. The blades (3) comprise part of a single adaptor (1) that can be removed and replaced with an adaptor having a different number of blades.

FIG. 3 illustrates a device (1) according to an embodiment of the present invention with the outer casing (6) opened up so that the frame (2) and two blades (3) can be seen. The frame (2) consists of a load-bearing structure made from steel panels and profiles to create a strong support. Idle rollers (4) ensure that the film material (not shown) is dispensed correctly and passed onto the two blades (3). The blades (3) slit the film material into three strips, each strip passing through a V-shaped recess (8) in the primary guide (7). The position of each strip in the V-shaped recess (8) and the concomitant strip width is dependent on the position of second guide (9), which in this embodiment is another idle roller. Again, in the embodiment shown, the primary guide (7) may be in the form of an adjustment plate. The adjustment plate (7) can be varied in its configuration depending on the strips to be obtained and its relative position determines the width of the film strip.

Figure 4:
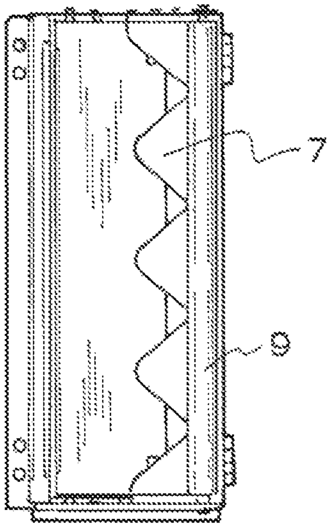
FIG. 4 illustrates the device (1) of FIG. 2 in plan view from the side to show the primary guide (7) and the secondary guide (9).

FIG. 4 illustrates the device (1) of FIG. 2 in plan view from the side to show the primary guide (7) and the secondary guide (9).

Figure 5:
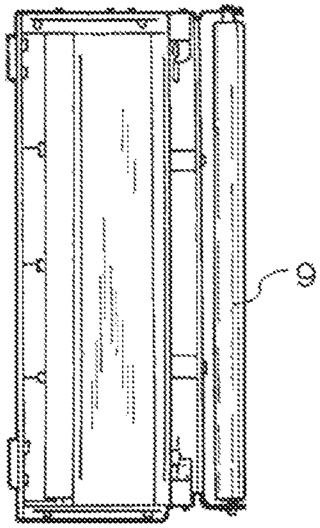
FIG. 5 illustrates the device (1) of FIG. 4 in plan view from the front showing the secondary guide (9).

FIG. 5 illustrates the device (1) of FIG. 4 in plan view from the front showing the secondary guide (9).

Figure 6:
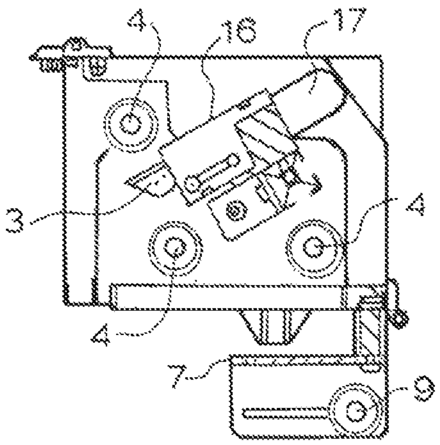
FIG. 6 is a cross sectional top plan view of the device (1) of FIG. 4 showing the position of one of the blades (3) together with the primary guide (7) and the secondary guide (9) in relation to the frame (2) of the device (1).

FIG. 6 is a cross sectional top plan view of the device (1) of FIG. 4 showing the position of one of the blades (3).

Figure 7:
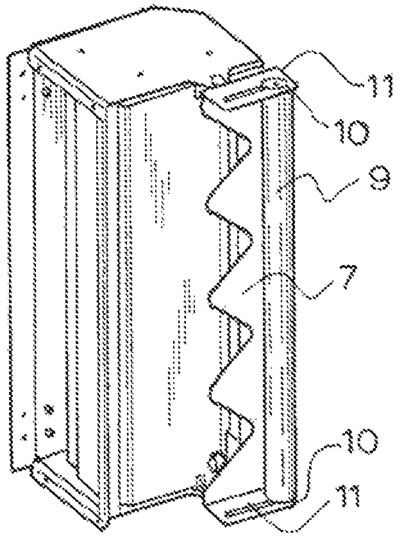
FIGS. 7, 8 and 9 illustrate one embodiment of a method of adjusting the relative positions of the primary guide (7) and secondary guide (9).
Figure 8:
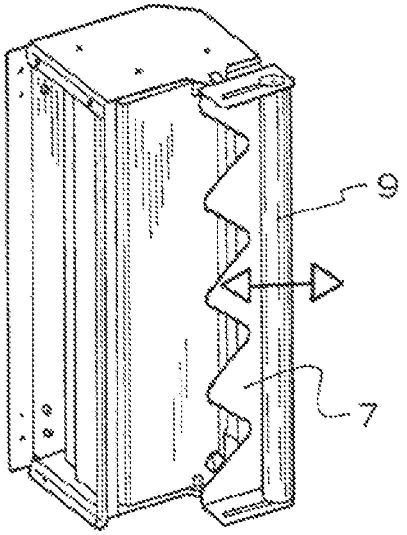
Figure 9:
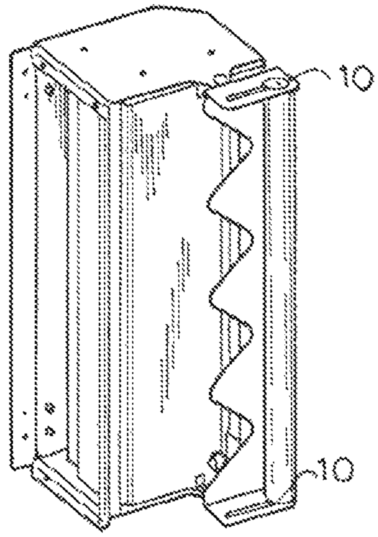

FIGS. 7, 8 and 9 illustrate one embodiment of the method of adjusting the relative positions of the primary guide (7) and secondary guide (9). In this embodiment, the secondary guide (9) has an adjustment screw (10) at either end. The screw (10) resides in a guide slot in a bracket (11) that is integral with or connected to the primary guide (7). The screw can be loosened (FIG. 7), moved, and the screw subsequently tightened to secure the secondary guide (9) in place (FIG. 9). In this manner, the secondary guide (9) can be moved left or right (the two directions being indicated by the double headed arrow of FIG. 8). Moving secondary guide (9) to the right causes the resultant strip(s) to be narrower. Moving secondary guide (9) to the left causes the resultant strip(s) to be wider. In alternate embodiments of the present invention, the relative adjustment and movement of the primary guide (7) and the secondary guide (9) may be automated such that the relative positioning of the guides can be altered by an operator of the stretch wrapping machine in situ or during operation of the wrapping machine. To achieve this end, it is envisaged that one or both guides may be installed with mechanical or motorised actuation for displacement with respect to the frame (2) of the adaptor (1). As would be appreciated by the person skilled in the art, there are a number of mechanical or motorised means available that can be fitted in connection with the primary and/or secondary guides, for example, at attachment points such as the bracket (11) in operative association with the primary guide (7).

In other embodiments of the present invention, the position of the primary guide (7) can be changed relative to the secondary guide (9). In yet another embodiment, the position of both the primary guide (7) and the secondary guide (9) can be changed. As indicated above, the altering of the positions of the primary guide (7) and/or the secondary guide (9) can be manual, or automated, or a combination of both.

Figure 10:
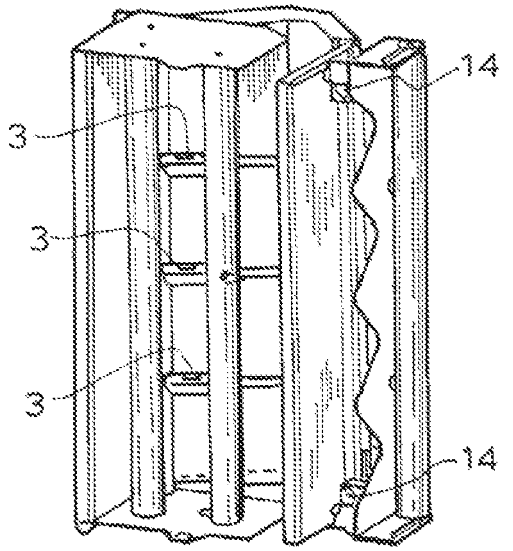
Figure 11:
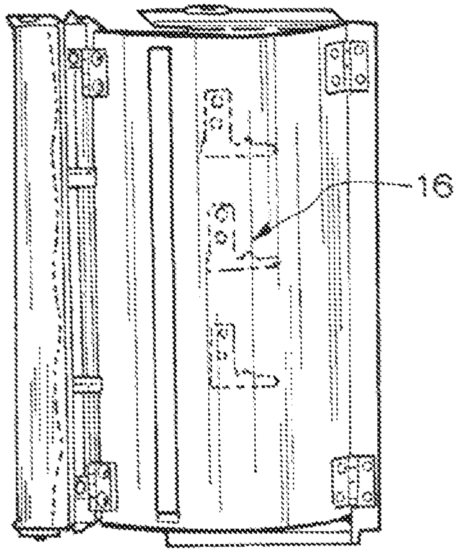
Figure 12:
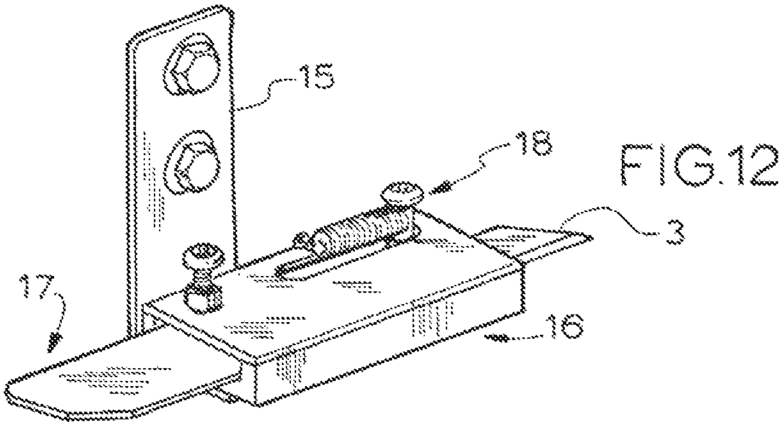

FIGS. 10 to 15 illustrate installation and replacement of blades. As mentioned previously, the blades (3) comprise part of a single adaptor unit that can readily be replaced by another adaptor unit with a different number of blades (3). Furthermore, individual blades (3) in an adaptor can readily be replaced if they wear or become blunt. This is illustrated with reference to the three-blade device (1) shown in FIG. 2. As a first step the device (1) is opened up by releasing the frame locks (14) so the primary guide (7) and secondary guide (9) can be swung out of the way (FIG. 10). Screws (15) holding the blade holder (16) to the adaptor can then be unscrewed (FIGS. 11 & 12). The blade holder (16) acts as a guard for protection of the blade (3). In this example the middle blade is removed. Screws (18) holding the blade (3) in the blade holder (16) are then unscrewed (FIG. 12). The blade (3) can then be snapped out of its holder and replaced with a new blade (FIG. 13). A similar process can be carried out for the other two blades (3) (FIG. 14). The components are then replaced and the relevant screws tightened. As a final step the device (1) is closed by swinging the primary guide (7) and secondary guide (9) back into place and re-engaging the frame locks (14) (FIG. 15). Preferably all screws (or alternatively bolts or lock nuts and the like) of every adjustable mechanical element are tightened following normal tightening values, without using any levers or spanners.

In preferred embodiments, the blades (3) may be disposed on the blade holder (16) in a retractable manner for protection of operators accessing the device. The retractable mechanism of the blades (3) may be facilitated by suitable biasing means holding the blades (3) in place. Alternatively, the blades may be manually slid into a retracted position for access and maintenance of the device. In normal operating conditions, when the door (5) is opened, the blades (3) are protected by a moving slide or guard that prevents operators from reaching them. In the embodiments illustrated, the blade holder (16) itself acts as the moving slide or guard.

Figure 16:
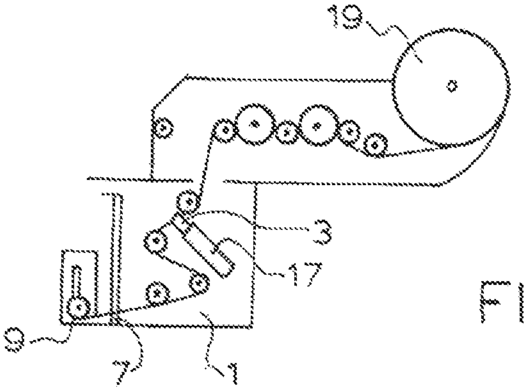
FIG. 16 and FIG. 17 illustrate in top plan view, two types of pallet wrapping machines (PS FIG. 16; EM FIG. 17) cooperating with a device (1) according to embodiments of the present invention.
Figure 17:
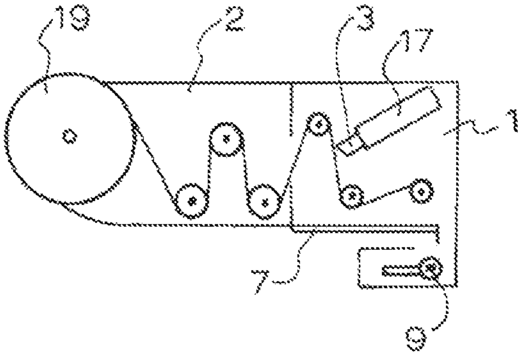

The device of embodiments of the present invention may be used to slit a roll of film material emanating from a roll within a packaging machine, such as a pallet wrapping machine. As such, a device of a preferred embodiment of the present invention may be applicable as an operative adaptor to stretch wrapping machines for producing ventilated film in situ using standard non-ventilated stretch wrapping material. Preferably the device of a preferred embodiment of the present invention can be installed on packaging machine carriages with mechanical/electromechanical (EM) film regulation or carriages with motor-driven pre-stretching (PS). FIG. 16 and FIG. 17 illustrate, in top plan view, two types of pallet wrapping machines cooperating with a device (1) according to the present invention. FIG. 16 shows the device installed on a PS carriage of a pallet wrapping machine. FIG. 17 shows the device installed on an EM carriage of a pallet wrapping machine. A roll of film material (19), and the path taken by the film material through the wrapping machines and the device (1) can be clearly seen. In the example of FIG. 16 the device may be installed in a lateral adjacent fashion to the film outlet of the machine carriage. In the example of FIG. 17 the device may be installed in a series or longitudinal adjacent fashion to the film outlet of the machine carriage. Therefore, by virtue of the modular box component design of the device of a preferred embodiment of the present invention, it can be fitted as an adaptor to a number of wrapping machine models. As a modular adaptor for fitment to a range of stretch wrapping machines, by way of example, the device of the present invention may be fitted to a range of stretch wrapping machines sold and distributed by the present applicant, namely the range of Omni™ Stretch Wrapping Machines, which machines may also be distributed in markets under the brand C-One™. It is envisaged that the modular device of the present invention may also be fitted to stretch wrapping machines currently sold and distributed in the market under the brand names of other proprietors. For respective fitment to individual wrapping machines currently on the market, some minor modification to the fastening/fasteners and joining components will be applicable as would be understood by the person skilled in the art.

Figure 18:
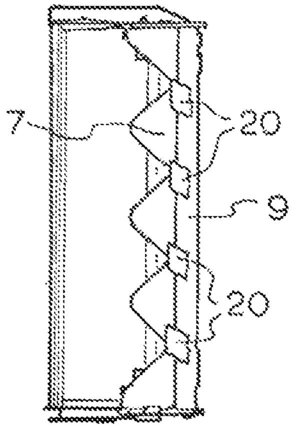
FIG. 18 illustrates strips of material (20) emerging from a device (1) according to preferred embodiments of the present invention.

FIG. 18 illustrates strips of material (20) cut from the roll of film material (19), passing through the V-shaped recesses (8) of the primary guide (7) and across the secondary guide (9).

Figure 19:
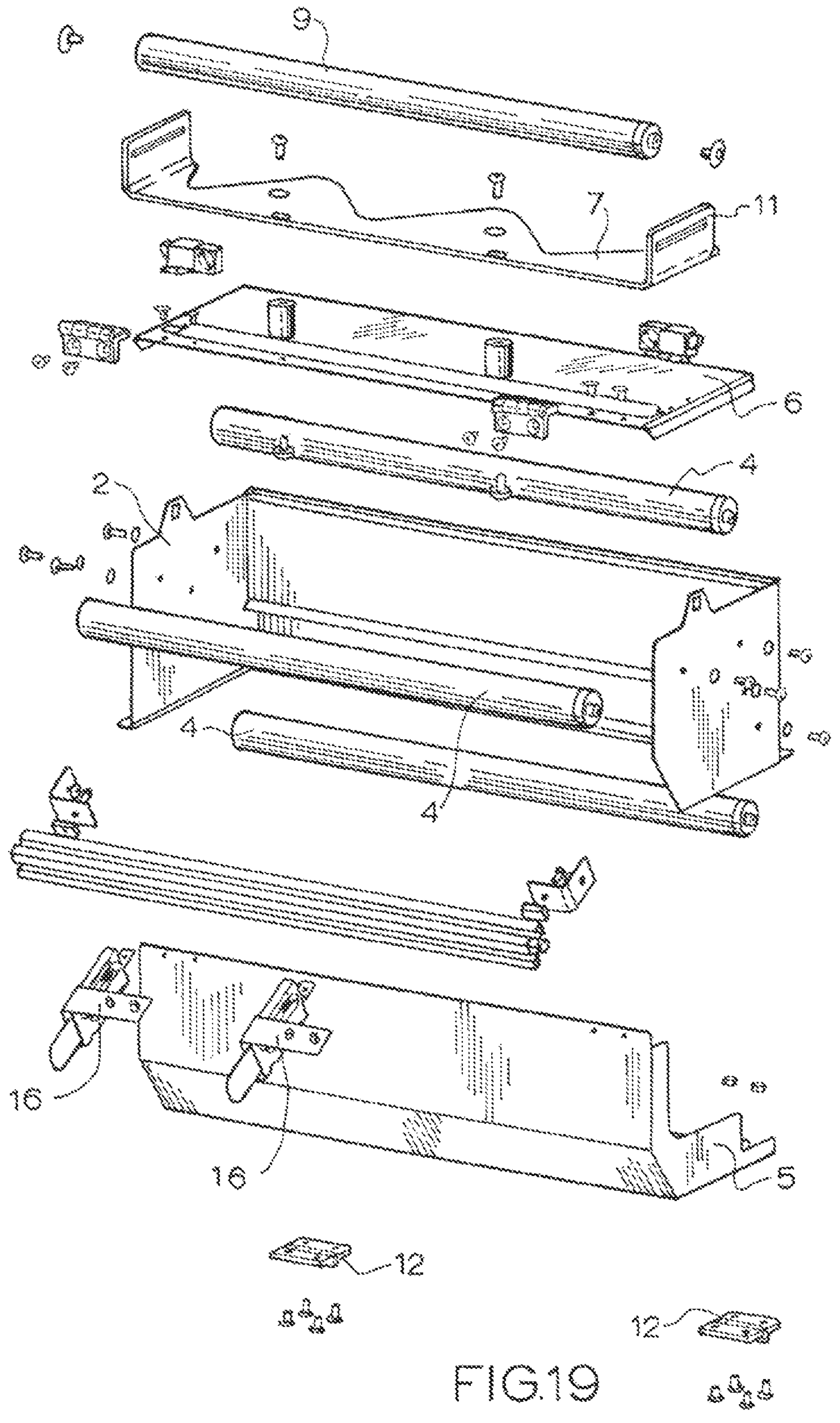
FIG. 19 illustrates the device of FIG. 3 in exploded view to show components in detail.

FIG. 19 illustrates the device of FIG. 2 in exploded view to show the component parts in detail.

Figure 20:
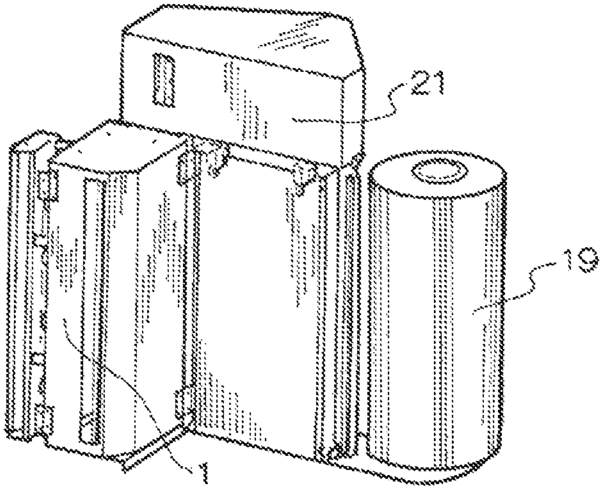
FIG. 20 illustrates, in perspective view, the device of FIG. 2 or FIG. 3 installed on a first type of pre-stretching carriage of a pallet wrapping machine.
Figure 21:
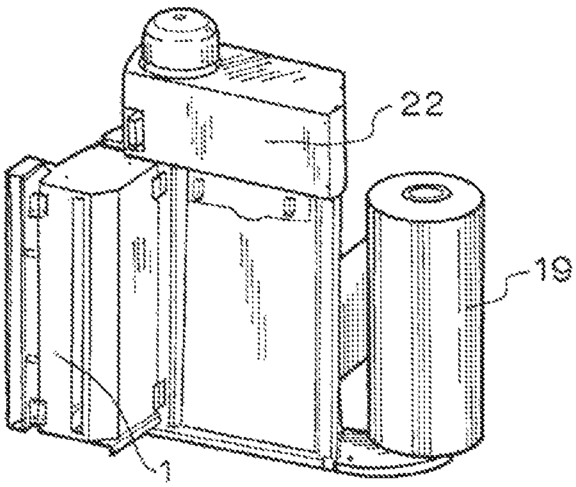
FIG. 21 illustrates, in perspective view, the device of FIG. 2 or FIG. 3 installed on a second type of pre-stretching carriage of a pallet wrapping machine.
Figure 22:
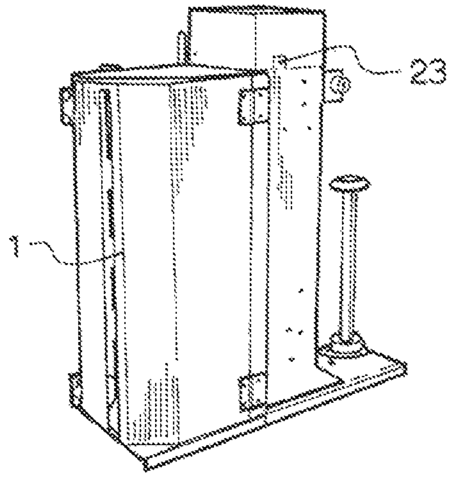
FIG. 22 illustrates, in perspective view, the device of FIG. 2 or FIG. 3 installed on an EM carriage of a pallet wrapping machine.

The device of embodiments of the present invention may be permanently or removably attached to a packaging machine, such as a pallet wrapping machine, by any convenient method. In one preferred embodiment the device can be located where the film material exits the pallet wrapping machine, such as at the pre-stretching carriage. The device of FIG. 2 or FIG. 3 may, for example, be installed on a pre-stretching carriage as shown in FIG. 20 and FIG. 21 or on an EM carriage of a pallet wrapping machine as shown in FIG. 22.

Typically, the device would be fastened to brackets, or pre-drilled holes located on the carriage of the machine. The fasteners could include conventional bolts, nuts, screws and washers.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the present specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

The following sections I-VII provide a guide to interpreting the present specification.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this specification", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present specification, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii)

a widget, a car and a wheel. The phrase "at least one of", when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 2, 3, 4, . . . 9) and non-whole numbers (e.g., 1.1, 1.2, . . . 1.9).

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a symbol, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title nor the Abstract in this specification is intended to be taken as limiting in any way as the scope of the disclosed invention(s). The title and headings of sections provided in the specification are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognise that the disclosed invention(s) may be practised with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, operations, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A modular adaptor for a pallet stretch-wrapping machine, adapted to provide strips of stretch film wrap of various widths, the adaptor comprising:

a blade assembly configured to slit an incoming web of stretch film wrap into two or more strips;

a primary guide disposed downstream of the blade assembly and comprising two or more tapered recesses, each recess dimensioned to receive and guide a respective one of the strips;

a secondary guide positioned downstream of the primary guide; and a mounting support structure by which the primary guide and the secondary guide are mounted for relative movement in a direction substantially parallel to a direction of travel of the strips, wherein the adaptor is configured, such that, changing the relative positions of the primary guide and the secondary guide repositions the strips within the respective tapered recesses and thereby varies an effective width of each strip.

2. The modular adaptor as claimed in claim 1 wherein the primary guide comprises a guide plate.

3. The modular adaptor as claimed in claim 1 wherein the secondary guide comprises a guide roller.

4. The modular adaptor as claimed in claim 1 wherein the blades are retractable for protection of operators.

5. The modular adaptor as claimed in claim 1 wherein the blades are guarded for protection of the blades.

6. The modular adaptor as claimed in claim 5 wherein the device further comprises a casing, which upon opening for access to component parts of the device causes the blades to be retracted and/or guarded.

7. The modular adaptor as claimed in claim 1 wherein the two or more shaped recesses are tapered in cross section.

8. The modular adaptor as claimed in claim 7 wherein the two or more shaped recesses provide one or a combination of roping and edging of the strips.

9. The modular adaptor as claimed in claim 7 wherein the two or more shaped recesses are V-shaped recesses.

10. The modular adaptor as claimed in claim 1 wherein the secondary guide comprises a roller.

11. The modular adaptor as claimed in claim 1 wherein the modular adaptor is adapted for being either removably or permanently attached to a pallet stretch-wrapping machine of one of a selection of machine formats or models.

12. The modular adaptor as claimed in claim 11 wherein the selection of machine formats or models comprises one of:

PS; or

EM.

13. A pallet wrapping system comprising:

a pallet wrapping machine configured to wrap palletised loads with stretch film wrap, and;

the modular adaptor of claim 1 operatively mounted to the pallet wrapping machine.

14. A pallet wrapping system comprising;

a blade assembly configured to slit an incoming web of stretch film wrap into two or more strips;

a primary guide disposed downstream of the blade assembly and comprising two or more tapered recesses, each recess dimensioned to receive and guide a respective one of the strips;

a secondary guide positioned downstream of the primary guide; and a mounting support structure by which the primary guide and the secondary guide are mounted for relative movement in a direction substantially parallel to a direction of travel of the strips, wherein the system is configured, such that, changing the relative positions of the primary guide and the secondary guide repositions the strips within the respective tapered recesses and thereby varies an effective width of each strip.

15. The system as claimed in claim 14 wherein the two or more shaped recesses are tapered in cross section.

16. The system as claimed in claim 15 wherein the two or more shaped recesses provide one or a combination of roping and edging of the strips.

17. The system as claimed in claim 16 wherein the two or more shaped recesses are on the primary guide and are V-shaped and/or form a saw tooth shaped leading edge of the primary guide.

18. The system as claimed in claim 14 wherein the secondary guide comprises a roller.

19. The system as claimed in claim 14 wherein the relative movement between the primary guide and the secondary guide is substantially in the direction of flow of the strips.

20. The system as claimed in claim 14 wherein the blades are retractable for protection of operators.

21. The system as claimed in claim 14 wherein the blades are guarded for protection of the blades.

22. The system as claimed in claim 21 wherein the modular device further comprises a casing, which upon opening for access to component parts of the modular device causes the blades to be retracted and/or guarded.

23. The system as claimed in claim 14 wherein the primary guide is disposed intermediate the blade assembly and the secondary guide.

24. The system as claimed in claim 14 wherein the relative positions of the primary and the secondary guides are variably changed as the strips pass across the guides to provide strips of variable width.

25. The pallet wrapping system as claimed in claim 14 wherein the primary guide comprises a guide plate.

26. The pallet wrapping system as claimed in claim 14 wherein the secondary guide comprises a guide roller.

27. The pallet wrapping system as claimed in claim 14 wherein the blade assembly is configured to slit the incoming web of stretch film wrap into two or more substantially parallel strips.

28. The pallet wrapping system as claimed in claim 14 wherein relative adjustment and movement of the primary guide and the secondary guide is automated such that the relative positioning of the respective guides can be altered by an operator.

* * * * *